US007811047B2

(12) United States Patent
Humble et al.

(10) Patent No.: US 7,811,047 B2
(45) Date of Patent: Oct. 12, 2010

(54) UNDERLAYMENT STICKERING STACKER ACTUATION

(76) Inventors: Erik L. Humble, c/o MOCO Engineering and Fabrication, Inc., 3212 N. Eden, Spokane, WA (US) 99216; Charles W. Moles, c/o MOCO Engineering and Fabrication, Inc., 3212 N. Eden, Spokane, WA (US) 99216

( * ) Notice: Subject to any disclaimer, the term of this patent is extended or adjusted under 35 U.S.C. 154(b) by 306 days.

(21) Appl. No.: 11/895,503

(22) Filed: Aug. 23, 2007

(65) Prior Publication Data
US 2009/0053030 A1 Feb. 26, 2009

(51) Int. Cl.
*B65G 57/00* (2006.01)
*H02P 3/14* (2006.01)

(52) U.S. Cl. ............... 414/789.5; 318/376; 414/794.1; 414/794.3; 414/793.4

(58) Field of Classification Search ......... 318/375–376; 414/789.5; 700/247–249; 901/19
See application file for complete search history.

(56) References Cited

U.S. PATENT DOCUMENTS

| | | | | | |
|---|---|---|---|---|---|
| 3,338,431 | A | * | 8/1967 | Thedick | 414/791.8 |
| 3,884,363 | A | * | 5/1975 | Ajlouny | 414/626 |
| 3,887,060 | A | * | 6/1975 | Kamhues | 198/426 |
| 4,264,253 | A | * | 4/1981 | Kennison | 414/789.5 |
| 4,423,807 | A | * | 1/1984 | Muller | 198/419.1 |
| 4,453,114 | A | * | 6/1984 | Nordlund | 318/376 |
| 4,602,195 | A | * | 7/1986 | Eberle et al. | 318/568.11 |
| 5,047,700 | A | * | 9/1991 | Szakaly | 318/568.1 |
| 6,684,788 | B2 | * | 2/2004 | Ohno et al. | 101/484 |
| 6,722,844 | B2 | * | 4/2004 | Lunden | 414/789.5 |
| 6,991,423 | B2 | * | 1/2006 | Hogue et al. | 414/791.6 |
| 2002/0182035 | A1 | * | 12/2002 | Karlen | 414/143.2 |
| 2006/0293791 | A1 | * | 12/2006 | Dariush | 700/245 |
| 2007/0041821 | A1 | * | 2/2007 | Humble et al. | 414/788.1 |
| 2009/0053031 | A1 | * | 2/2009 | Humble et al. | 414/789.5 |

OTHER PUBLICATIONS

Kansas State Uni., Electronic Machine Drives: a brief overview, avail. on Apr. 26, 2006 @ http://eece.ksu.edu/~starret/581/topic.F95/schartz.html.*
Rockwell Automation, Regeneration Vs Dynamic Braking in DC Drives, 2000, avail. on Sep. 3, 2003 @ http://www.reliance.com/prodserv/standriv/appnotes/d7733.pdf.*

* cited by examiner

*Primary Examiner*—Gregory W Adams
(74) *Attorney, Agent, or Firm*—John S. Reid

(57) ABSTRACT

In one representative example an underlayment stickering stacker includes a carriage/fork device configured to move a course of material with underlaid sticks from a course forming station to a hoist device, thereby forming the stack of material. The stacker also includes a rake-off device configured to facilitate removal of the course of material from the carriage/fork device. The stacker also includes a regenerative actuator configured to provide regenerative braking power to one of the hoist device, the carriage/fork device and the rake-off device.

5 Claims, 9 Drawing Sheets

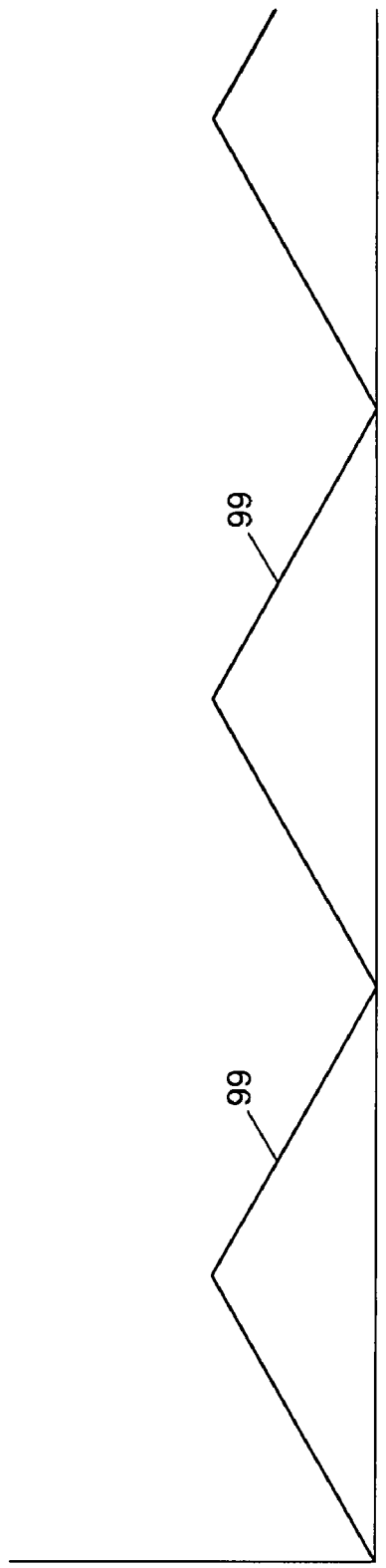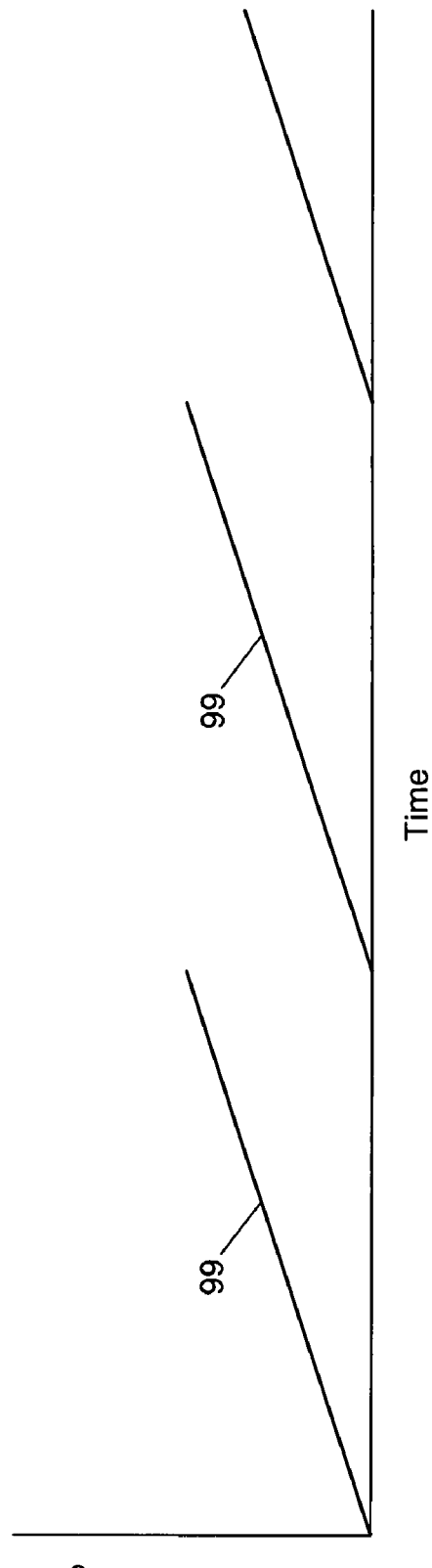

UNDERLAYMENT STICKERING STACKER ACTUATION

BACKGROUND

As can be appreciated, the arrangement of a given quantity of sawn lumber into stacks can facilitate handling, transportation, storage and/or various processing, such as drying and the like, of the lumber. Various types of lumber stackers are known to those of ordinary skill in the art, which can be employed for automatically forming bulk lumber into stacks of a predetermined size. In general, such lumber stackers are configured to stack lumber by forming, and then stacking, one complete layer or course at a time.

One category of lumber stackers is generally known as "stickering stackers" to those skilled in the art. Stickering stackers are configured to automatically place "stickers" or "sticks" between adjacent courses of lumber as part of the stacking process. The placement of sticks between courses of lumber in the stack can serve several purposes. For example, placement of the sticks in a direction transverse to the direction of the lumber can help tie the stack together. As another example, placement of the sticks between courses can create spaces between the lumber, which can facilitate drying or other treatment processes.

Within the category of stickering stackers is a subcategory known to those in the art as "underlayment stickering stackers." An underlayment stickering stacker is defined as a stickering stacker that is configured to form a given lumber course with underlaid sticks, and then to place the given course along with the underlaid sticks onto the stack. That is, an underlayment stickering stacker is configured to form a given lumber course on top of the associated sticks, and to move the lumber course together with the associated underlaid sticks so as to place the course and sticks onto the stack.

Conventional underlayment stickering stackers often include several main subassemblies or devices. Such devices can include, for example, one or more of an infeed conveyor, a carriage/fork device, a rake-off device, a stick device, and a hoist device. Conventional underlayment stickering stackers can also include associated actuators, mechanisms, and controls corresponding to each of the devices.

During operation of conventional underlayment stickering stackers, the infeed conveyor can facilitate formation of a course of lumber at a course-forming station. The stick device is operated to facilitate insertion of sticks beneath the lumber course as the lumber course is being formed. The carriage/fork device is then operated to pick up the lumber course along with the underlaid sticks from the course-forming station, and to move the course and sticks to a stacking station above the hoist device.

The carriage/fork device, in conjunction with the rake-off device, then places the lumber course and associated underlaid sticks onto a previously placed lumber course to form the stack (alternatively, the course is placed directly onto the hoist, if the course if the first course of a stack). More specifically, the rake-off device can be lowered after the carriage/fork is moved into position above the hoist device. Then, as the carriage/fork device is withdrawn from the stack, the rake-off device contacts the lumber course and associated underlaid sticks to allow the carriage/fork device to be pulled from beneath the lumber course and sticks. In this manner the lumber course and associated underlaid sticks are deposited on the stack. The hoist device can then be moved downward after each course is placed on the top of the stack in order to keep the top of the stack at a substantially constant elevation.

It is generally understood by those of ordinary skill in the art that each of the main devices of a conventional underlayment stickering stacker, as described above, can include or be made up of a plurality of subcomponents. For example, the infeed conveyor can include a board unscrambler, an even ending rollcase, and feed chain. Similarly, the carriage/fork device can include a carriage configured to move in a substantially horizontal direction between the course forming station and the stack, as well as a fork supported by the carriage, wherein the fork can be configured to pivot and/or move in a substantially vertical direction.

Likewise, the stick device can include one or more of a singulating feed mechanism, a stick distribution mechanism, and a stick inserter mechanism. The singulating feed mechanism can be configured to singulate bulk sticks and to selectively place individual sticks onto the stick distribution system. The stick distribution system can be configured to selectively deliver sticks to predetermined positions below the carriage/fork device. The stick inserter mechanism can be configured accept the sticks from the stick distribution system and to facilitate insertion of the sticks between the fork and the course being formed at the course forming station. It is further understood that each of these subcomponents can include associated drive linkages, actuators and control components.

Conventional underlayment stickering stackers include one or more types of actuation devices to impart motion and power to the major moving parts in conjunction with associated drive linkages and the like. For example, conventional stackers often employ hydraulic cylinders and/or hydraulic motors and/or conventional electric motors, along with various linkages, power transmission systems, and other such mechanisms, to impart motion and power to the major moving parts of the stacker.

Control systems of conventional underlayment stickering stackers often include one or more processors and/or controllers as well as a variety of other peripheral control devices such as limit switches, proximity switches, automatic valves, relays and the like. The processors and/or controllers that are employed to operate conventional underlayment stickering stackers generally include a set of computer-executable instructions or code (e.g., a "program") that, together with other components, is configured to control operation of the actuation devices to thereby enable substantially automatic operation of the stacker.

Those skilled in the art will understand that conventional stackers can include other components and the like which are not specifically discussed herein, but which are known to those of ordinary skill in the art.

DESCRIPTION OF THE DRAWINGS

FIG. 6 is a schematic diagram in which the stacker is depicted.

FIG. 7 is a schematic diagram in which a master signal is depicted.

DETAILED DESCRIPTION

Figure 1:
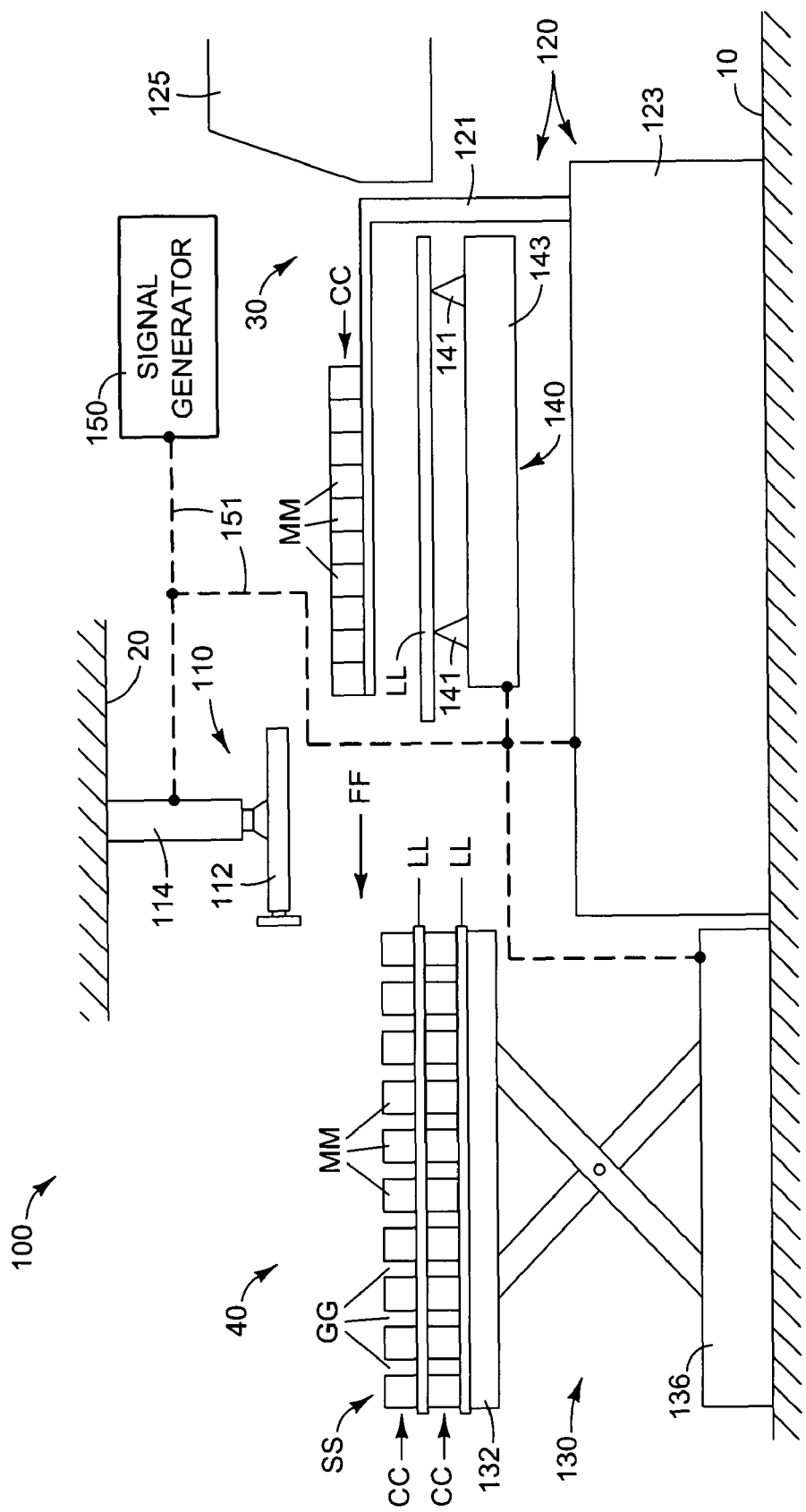
FIG. 1 is a side elevation schematic diagram in which a stacker is depicted.

With reference to the drawings, FIG. 1 depicts a side elevation schematic representation of an underlayment stickering stacker apparatus 100 in accordance with at least one embodiment of the disclosure. The stacker 100 can include a rake-off system 110, a carriage/fork system 120, a hoist system 130, and a stick system 140. An infeed device 125 can also be included in the stacker 100. The rake-off system 110, the carriage/fork system 120, the hoist system 130, and the stick system 140 can be supported by one or more of a base support 10 and/or an overhead support 20. It is to be understood that any one of the rake-off system 110, the carriage/fork system 120, the hoist system 130, and the sticker system 140, can serve as a support to at least a portion of any or all of the other systems. It is also to be understood that two or more of these systems (110, 120, 130, 140) can be substantially integral with one another.

The rake-off system 110 can include a rake-off device 112 and a rake-off actuation system 114 that is configured to impart movement and/or mechanical power to the rake-off device. The carriage/fork system 120 can include a carriage/fork device 121 and a carriage/fork actuation system 123 that is configured to impart movement and/or mechanical power to the carriage/fork device. Likewise, the hoist system 130 can include a hoist device 132 and a hoist actuation system 136 that is configured to impart movement and/or mechanical power to the hoist device. Similarly, the stick system 140 can include a stick device 141 and a stick actuation system 143 that is configured to impart movement and/or mechanical power to the stick device.

It is to be understood that a stacking apparatus in accordance with one or more embodiments of the present disclosure can include one or more of the rake-off device 112, the carriage/fork device 121, the hoist device 132, and the stick device 141, each of which can be configured substantially in the manner of conventional devices known to those of ordinary skill in the art to be employed for performing stacking tasks and/or operations as generally described herein. However, it is also to be understood that such a stacking apparatus in accordance with one or more embodiments of the present disclosure also includes a signal generator 150, and one or more of the rake-off actuation system 114, the carriage/fork actuation system 123, the hoist actuation system 136, and the stick actuation system 143, each of which includes one or more novel aspects as described herein below in conjunction with the associated drawings.

As mentioned briefly above, the stacker 100 includes the signal generator 150.

The stacker 100 can include a communications link 151 that communicatively links the rake-off actuation system 114 and/or the carriage/fork actuation system 123 and/or the hoist actuation system 136 and/or the stick actuation system 143 with the signal generator 150. The signal generator 150 is configured to generate a cyclical master 20 signal that can be received by the rake-off actuation system 114 and/or the carriage/fork actuation system 123 and/or the hoist actuation system 136 and/or the stick actuation system 143.

The rake-off actuation system 114 and/or the carriage/fork actuation system 123 and/or the hoist actuation system 136 and/or the stick actuation system 143 can be configured to operate as a function of the master signal generated by the signal generator 150. That is, the rake-off actuation system 114 and/or the carriage/fork actuation system 123 and/or the hoist actuation system 136 and/or the stick actuation system 143 can be configured to cause the rake-off device 112, the carriage/fork device 121, the hoist device 132, and the stick device 141 respectively, to move as a function of the master signal generated by the signal generator 150, as is discussed in greater detail herein below.

Still referring to FIG. 1, material MM, such as sawn lumber, is to be placed into a stack SS by the stacker 100. The stack SS can be made up of a plurality of courses CC or layers that are stacked, one upon another. The stack SS can also include one or more sticks LL that extend between two adjacent courses CC of the stack. The material MM can be elongated material such as lumber or the like. In FIG. 1, the material MM is depicted in an end view.

The sticks LL can also be elongated and can be placed within the stack SS in a direction that is substantially transverse to the direction of the material MM, as depicted. The material MM can be brought to the stacker 100 by way of the infeed device 125. The infeed device 125 can bring the material MM to a staging area or course forming station 30. A supply of sticks LL can also be held within and/or brought to the stick device 140 by way of any of a number of conventional means known to those of ordinary skill in the art. It is to be understood that sticks LL need not be placed under every course CC. For example, in accordance with some stacking operations, sticks LL will not be placed under the initial, or bottom, course CC of material MM in the stack SS.

The carriage/fork device 121 can be moved by the carriage/fork actuation system 123 in a manner whereby each course of material MM formed at the course forming station 30 is lifted from the course forming station and is moved toward the hoist 132 in the direction PP. The course of material MM, as it is moved by the carriage/fork device 121, can pass beneath the rake-off device 112, which can be in a raised position so as to allow such passage of the material.

Additionally, the stick system 140 can operate to facilitate placement of a plurality of sticks LL between two adjacent courses CC as the stack is formed. Sticks LL can be placed in the stack SS by any of a number of manners. For example, in accordance with several various methods known to those of ordinary skill in the art, the sticks LL can be placed by the stick device 141 onto the carriage/fork device 121 beneath the course of material MM. In this manner, the carriage/fork device 121 can move the underlaid sticks LL along with the course of material MM from the course forming station 30 to the stack SS.

Figure 2:
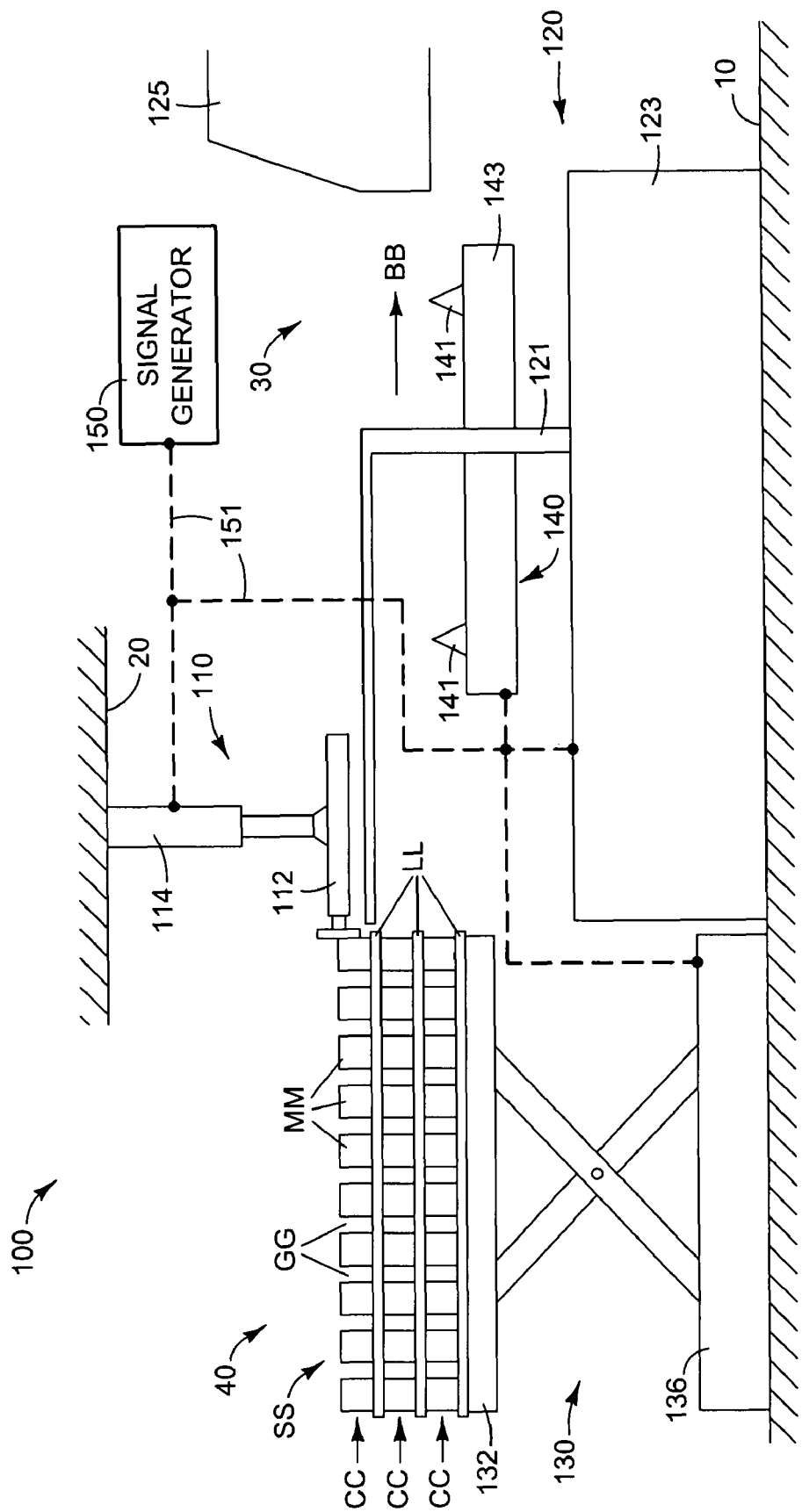
FIG. 2 is a side elevation schematic diagram in which the stacker is depicted.

Turning now to FIG. 2, another side elevation schematic representation of the stacker 100 is depicted in accordance with at least one embodiment of the disclosure. From a study of FIG. 2 relative to FIG. 1, it is seen that the carriage/fork device 121 has moved a course CC from the course forming station 30 to the stack SS. As is also seen, the rake-off device 112 has been moved to a lowered position, wherein the rake-off device can substantially prevent movement of the material MM and sticks LL as the carriage/fork device 121 is withdrawn from beneath the top course CC, and then is moved back toward the course forming station 30 in the direction BB to pick up another course CC of material MM. Accordingly, such action of the rake-off device 112 can be described as raking the course CC and sticks LL off of the carriage/fork device 121. In this manner, each course CC of the stack SS can be formed.

After the material MM, and in some instances the sticks LL, are placed on the stack SS in the manner described immediately above, the hoist device 132 can then move the stack downward so that the top of the stack remains substantially at a given elevation as courses are added to the stack. Also, after the material MM is placed on the top of the stack SS in the manner described above, the rake-off device 112 can then be moved back to the raised position as is depicted in FIG. 1 in order to allow the next course CC of material MM to pass beneath as is also described above with reference to FIG. 1. These movements of the rake-off device 112, the carriage/fork device 121 and the hoist device 132 can be repeated until the stack SS is completed with a predetermined number of courses CC.

Figure 3:
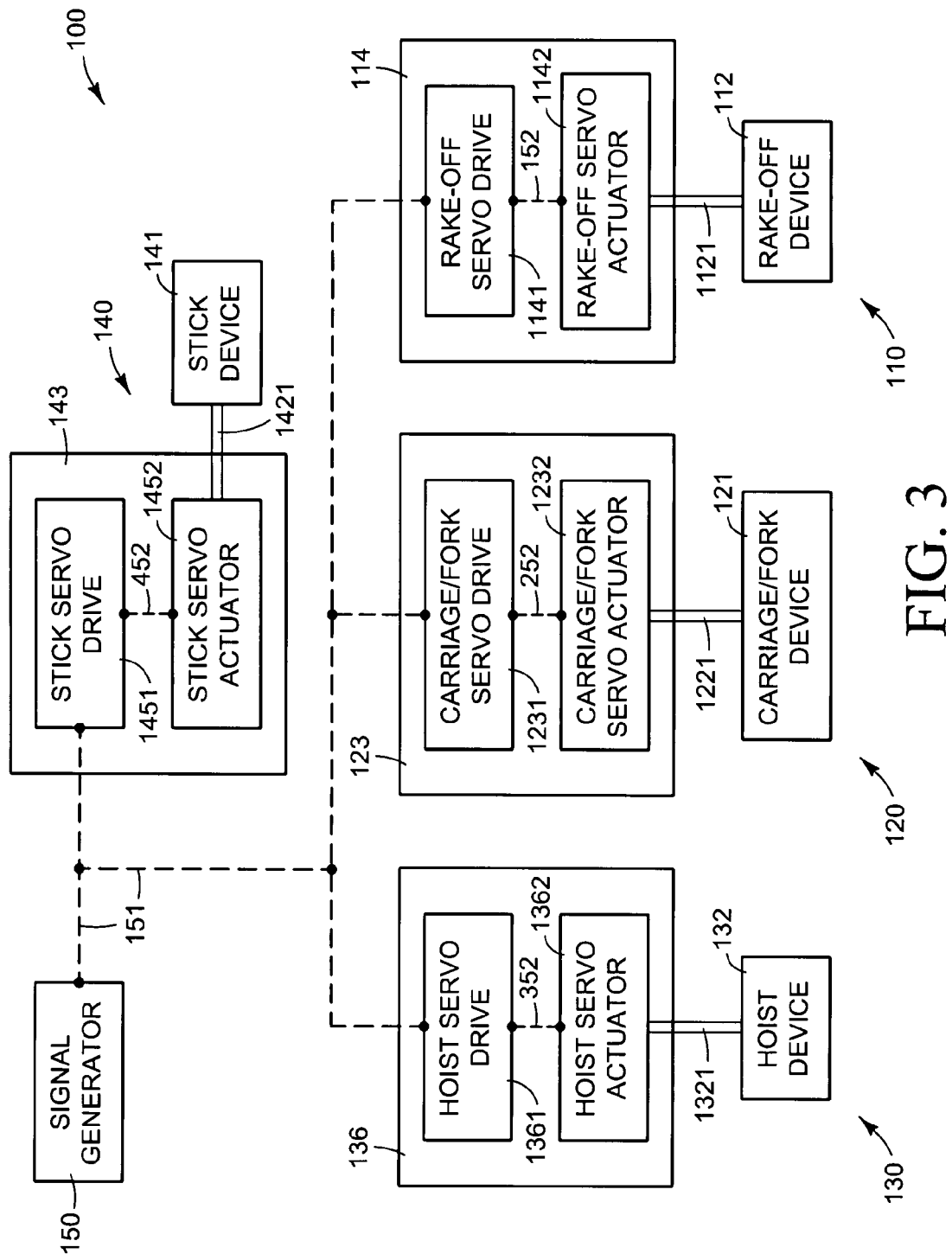
FIG. 3 is a schematic diagram in which the stacker is depicted.

With reference to FIG. 3, a schematic diagram is depicted in accordance with at least one embodiment of the disclosure. As is seen from a study of FIG. 3, the stacker 100 can include the signal generator 150. The stacker 100 can also include the stick system 140 and/or the hoist system 130 and/or the carriage/fork system 120 and/or the rake-off system 110, each of which can be communicatively linked to the signal generator 150 by way of the communications link 151.

The stick system 140 can include the stick device 141 and the stick actuation system 143. The stick actuation system 143 can include a stick servo drive 1451 and a stick servo actuator 1452, which can be communicatively linked by way of a stick control link 452. The hoist system 130 can include the hoist device 132 and the hoist actuation system 136. The hoist actuation system can include a hoist servo drive 1361 and a hoist servo actuator 1362, which can be communicatively linked by way of a hoist control link 352. The carriage/fork system 120 can include the carriage/fork device 121 and the carriage/fork actuation system 123. The carriage/fork actuation system 123 can include a carriage/fork servo drive 1231 and a carriage/fork servo actuator 1232, which can be communicatively linked by way of a carriage/fork control link 252. Likewise, the rake-off system 110 can include the rake-off device 112 and the rake-off actuation system 114. The rake-off actuation system 114 can include a rake-off servo drive 1141 and a rake-off servo actuator 1142, which can be communicatively linked by way of a rake-off control link 152.

The stick servo actuator 1452 can be mechanically linked to the stick device 141 to impart movement thereto by way of a stick mechanism 1421. The hoist servo actuator 1362 can be mechanically linked to the hoist device 132 to impart movement thereto by way of a hoist mechanism 1321. The carriage/fork servo actuator 1232 can be mechanically linked to the carriage/fork device 121 to impart movement thereto by way of a carriage/fork mechanism 1221. Likewise, the rake-off servo actuator 1142 can be mechanically linked to the rake-off device 132 to impart movement thereto by way of a rake-off mechanism 1121.

It is to be understood that each of the stick servo actuator 1452 and/or hoist servo actuator 1362 and/or the carriage/fork servo actuator 1232 and/or the rake-off servo actuator 1142 can have any of a number of possible specific forms, including, but not limited to a rotary actuator and a linear actuator. Moreover, one or more of the rake-off servo actuator 1142, the carriage/fork servo actuator 1232 and the hoist servo actuator 1362 and the stick servo actuator 1452 can be a regenerative servo actuator, as is discussed in detail herein below.

It is also to be understood that the stick mechanism 1421 and/or hoist mechanism 1321 and/or the carriage/fork mechanism 1221 and/or the rake-off mechanism 1121 can have any of a number of possible specific forms and/or can include any of a number of specific components such as, but not limited to, rack and pinion assemblies, gears, cogs, belts, pulleys, chains, levers, slides, rollers, tracks, guides, screws, and the like, for the purpose of transferring and/or imparting mechanical power and/or movement to the stick device 141, the hoist device 132, the carriage/fork device 121, and the rake-off device 112, respectively.

With continued reference to FIG. 3, the signal generator 150 is configured to generate a cyclical master signal, which is discussed in greater detail below. The signal generator 150 can also configured to transmit the master signal to one or more of the stick servo drive 1451, the hoist servo drive 1361, the carriage/fork servo drive 1231 and the rake-off servo drive 1141 by way of the communications link 151. Likewise, each of the stick servo drive 1451, the hoist servo drive 1361, the carriage/fork servo drive 1231 and the rake-off servo drive 1141, can be configured to receive the master signal that is generated by the signal generator 150.

One or more of the rake-off servo drive 1141, the carriage/fork servo drive 1231, the hoist servo drive 1361, and the stick servo drive 1451, can be configured to generate respective servo control signals in response to the master signal. Specifically, for example, the rake-off servo drive 1141 can be configured to generate a rake-off control signal as a function of the master signal. The rake-off control signal can be transmitted to the rake-off servo actuator 1142 by way of the rake-off control link 152. The rake-off servo actuator 1142 can then impart movement to the rake-off device 112 by way of the rake-off mechanism 1121 and in response to the rake-off control signal.

By way of further example, the carriage/fork servo drive 1231 can be configured to generate a carriage/fork control signal as a function of the master signal. The carriage/fork control signal can be transmitted to the carriage/fork servo actuator 1232 by way of the carriage/fork control link 252. The carriage/fork servo actuator 1232 can then impart movement to the carriage/fork device 121 by way of the carriage/fork mechanism 1211 and in response to the carriage/fork control signal.

Likewise, for example, the hoist servo drive 1361 can be configured to generate a hoist control signal as a function of the master signal. The hoist control signal can be transmitted to the hoist servo actuator 1362 by way of the hoist control link 352. The hoist servo actuator 1362 can then impart movement to the hoist device 132 by way of the hoist mechanism 1321 and in response to the hoist control signal.

Similarly, for example, the stick servo drive 1451 can be configured to generate a stick control signal as a function of the master signal. The stick control signal can be transmitted to the stick servo actuator 1452 by way of the stick control link 452. The stick servo actuator 1452 can then impart movement to the stick device 141 by way of the stick mechanism 1421 and in response to the stick control signal.

In other words, in accordance with one embodiment of the disclosure, the stick servo drive 1451 can be configured to cause the stick servo actuator 1452 to impart movement to the stick device 141 as a function of the master signal generated by the signal generator 150. The hoist servo drive 1361 can be configured to cause the hoist servo actuator 1362 to impart movement to the hoist device 132 as a function of the master signal generated by the signal generator 150. Similarly, the carriage/fork servo drive 1231 can be configured to cause the carriage/fork servo actuator 1232 to impart movement to the carriage/fork device 121 as a function of the master signal generated by the signal generator 150. Likewise, the rake-off servo drive 1141 can be configured to cause the rake-off servo actuator 1142 to impart movement to the rake-off device 112 as a function of the master signal generated by the signal generator 150.

As is apparent from the preceding discussion, the rake-off device 112 and the carriage/fork device 121 and the hoist device 132 and the stick device 141 can each be described as having an predetermined, cyclical, associated motion pattern through which the associated device moves during normal operation of the apparatus 100. That is, each of the devices 112, 121, 132, 141 has an associated motion pattern or path through which the respective device repetitively moves during normal operation of the apparatus 100. For example, the rake-off device 112 repetitively moves between a raised position and a lowered position, while the carriage/fork device 121 repetitively moves between the course forming station 30 and the stack SS, while the hoist device 132 repetitively moves downward each time a course is placed on the stack SS, while the stick device 141 repetitively moves to insert sticks beneath each lumber course CC.

More specifically, the hoist servo actuator 1362 is configured to move the hoist device 132 according to a predetermined cyclical hoist motion pattern, while the carriage/fork servo actuator 1232 is configured to move the carriage/fork device 121 according to a predetermined cyclical carriage/fork motion pattern. Similarly, the rake-off servo actuator 1142 is configured to move the rake-off device 112 according to a predetermined cyclical rake-off motion pattern. Likewise, the stick servo actuator 1452 is configured to move the stick device 141 according to a predetermined cyclical stick motion pattern.

Thus, the hoist servo drive 1361 can be configured so as to cause the hoist motion pattern to be substantially synchronized with the master signal during operation of the apparatus 100. Likewise, the carriage/fork servo drive 1231 can be configured so as to cause the carriage/fork motion pattern to be substantially synchronized with the master signal during operation of the apparatus 100. Also, the rake-off servo drive 1141 can be configured so as to cause the rake-off motion pattern to be substantially synchronized with the master signal during operation of the apparatus 100. Similarly, the stick servo drive 1451 can be configured so as to cause the stick motion pattern to be substantially synchronized with the master signal during operation of the apparatus 100.

Figure 4:
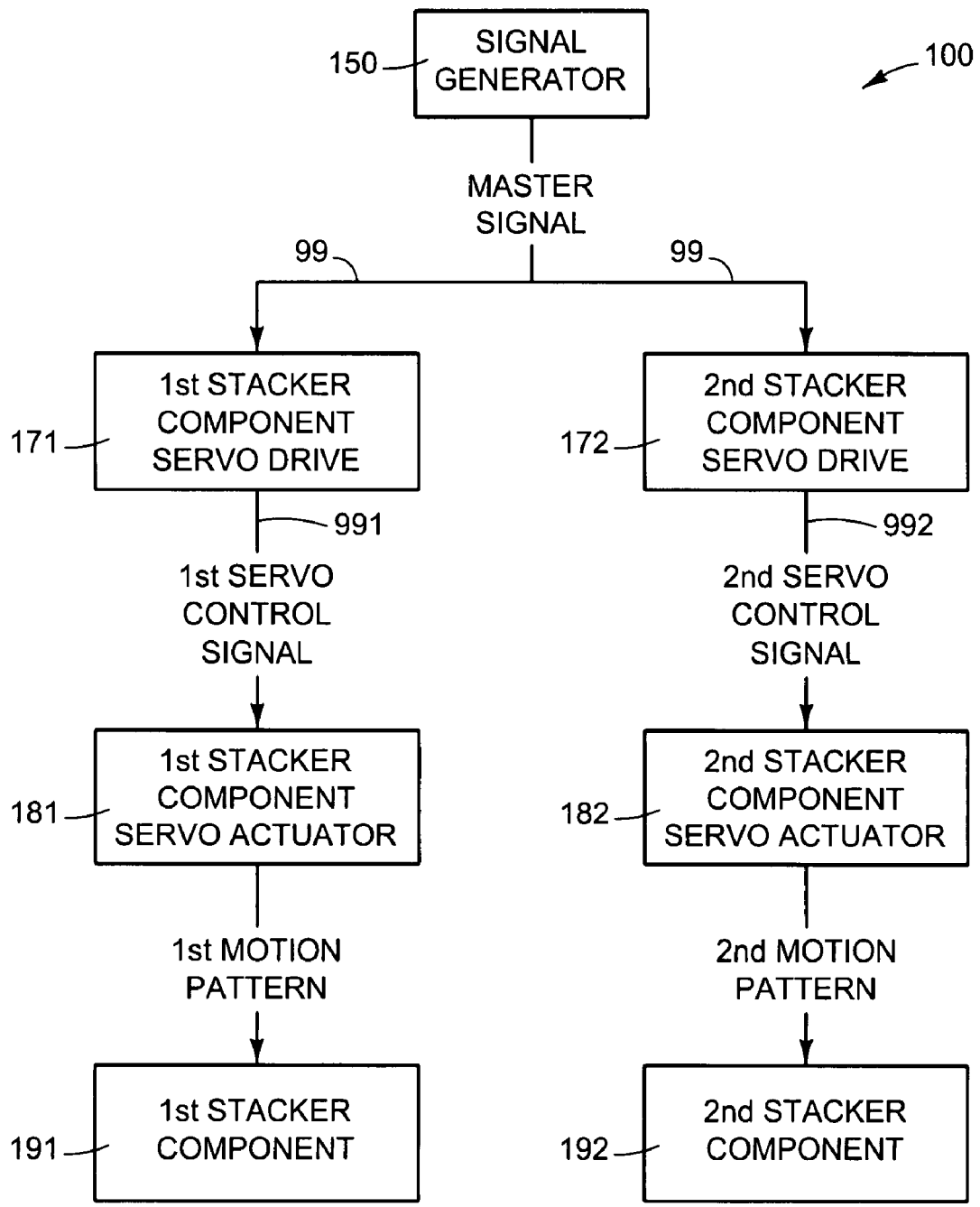
FIG. 4 is a schematic diagram in which the stacker is depicted.

Turning now to FIG. 4, another schematic diagram is shown in which the stacker 100 is depicted in accordance with at least one embodiment of the disclosure. The signal generator 150 is configured to generate a cyclical master signal 99. The master signal 99 can be transmitted, or otherwise sent, to one or more stacker component servo drives, such as, for example, a first stacker component servo drive 171 and a second stacker component servo drive 172. It is to be understood that the first stacker component and the second stacker component, as well as related servo drives and servo actuators, as depicted in FIG. 4, can be components of, for example, one of the stick device 140, the hoist device 130, the carriage/fork device 120 and the rake-off device 110, discussed above with respect to FIGS. 1-3.

Still referring to FIG. 4, each of the stacker component servo drives 171, 172 can receive and read the master signal 99. In response to reading the master signal 99, the first stacker component servo drive 171 can perform first servo control operations on a first stacker component servo actuator 181, wherein the first stacker component servo actuator is operated as a function of the master signal 99. In accordance with at least one embodiment of the present disclosure, the first stacker component servo drive 171 can generate first servo control signals 991 as a function of the master signal 99, wherein the first servo control signals 991 are transmitted from the first stacker component servo drive 171 to the first stacker component servo actuator 181. Receipt of the first servo control signals 991 by the first stacker component servo actuator 181 can result in operation of the first stacker servo actuator 181 so as to cause the first stacker component 191 to move according to a first motion pattern.

Likewise, in response to reading the master signal 99, the second stacker component servo drive 172 can perform second servo control operations on a second stacker component actuator 182, wherein the second stacker component servo actuator is operated as a function of the master signal 99. In accordance with at least one embodiment of the present disclosure, the second stacker component servo drive 172 can generate second servo control signals 992 as a function of the master signal 99, wherein the second servo control signals 992 are transmitted from the second stacker component servo drive 172 to the second stacker component servo actuator 182. Receipt of the second servo control signals 992 by the second stacker component servo actuator 182 can result in operation of the second stacker servo actuator 182 so as to cause the second stacker component 192 to move according to a second motion pattern.

That is, the first stacker component servo actuator 181 can induce a first motion pattern to a first stacker component 191, wherein the first servo motion is a pattern function of, and/or is synchronized with, the master signal 99, and which can result in predetermined movement of the first stacker component. Similarly, the second stacker component servo actuator 182 can induce a second motion pattern to a second stacker component 192, wherein the second servo motion is a function of, and/or is synchronized with, the master signal 99, and which can result in predetermined movement of the second stacker component.

It is to be understood that the first servo control signals 991 and the second servo control signals 992 can have any of a number of possible forms such as, but not limited to, data control signals, and/or electrical power control signals, wherein such data control signals and/or power control signals can include frequency and/or amplitude modulation and/or polarity change, and can control the speed and/or direction of, and/or mechanical power produced by, the respective servo actuator.

Moreover, it is to be understood that the first servo control signals 191 and the second servo control signals 192 can be substantially identical to, or substantially different from, each other. Likewise, it is to be understood that the first motion pattern and the second motion pattern can be identical to, or different from, each other. That is, it is to be understood that the first servo control signals 191 and/or movement of the first stacker component servo actuator 181 can be completely independent from the second servo control signals 992 and/or movement of the second stacker component servo actuator 182, respectively.

Figure 5:
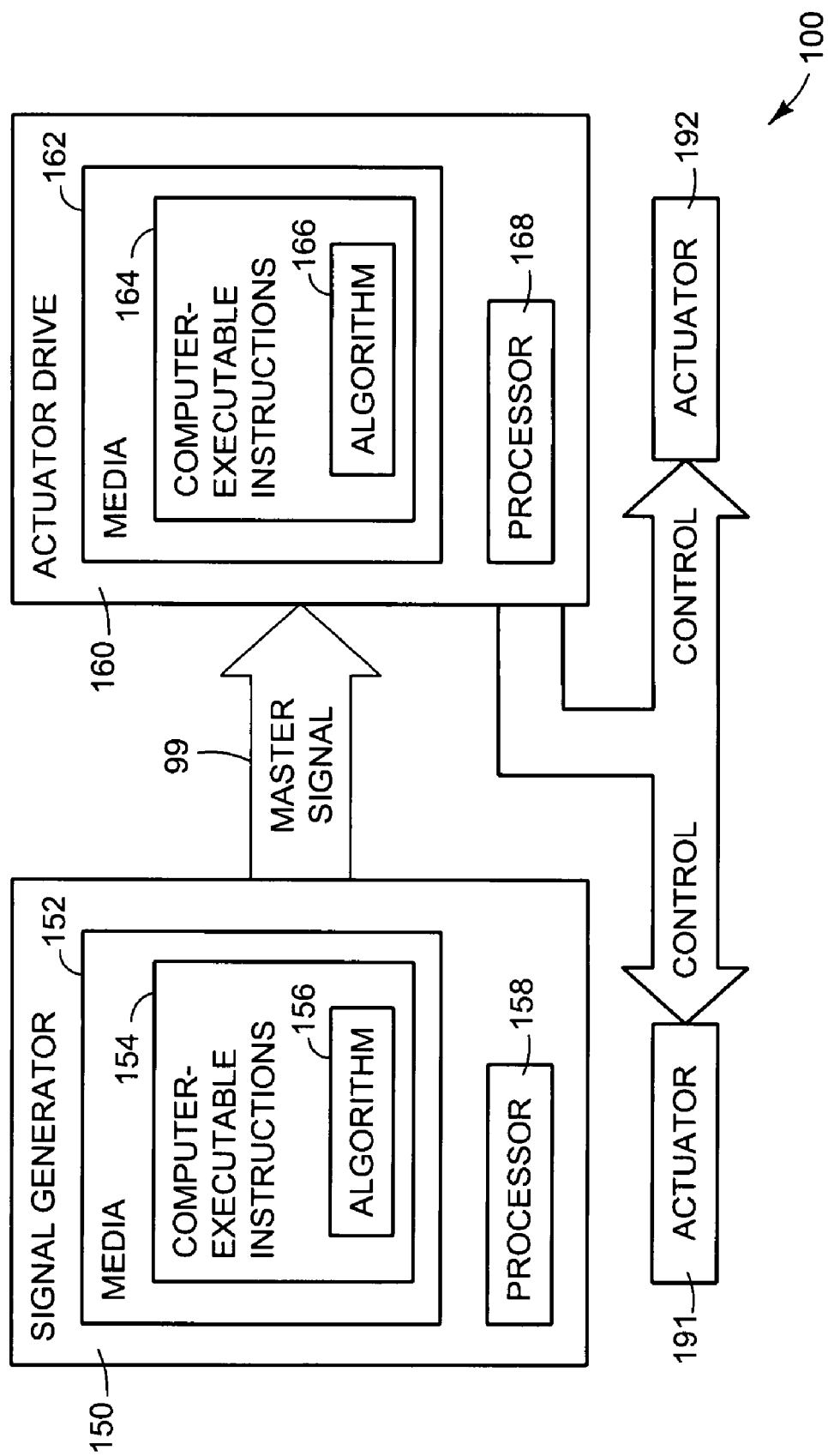
FIG. 5 is a schematic diagram in which the stacker is depicted.

With reference now to FIG. 5, yet another schematic diagram is shown in which the stacker 100 is depicted in accordance with at least one embodiment of the disclosure. The signal generator 150 can include one or more of a processor 158, computer-readable media 152 accessible by the processor, a set of computer-executable instructions 154 stored on the media, and an algorithm 156 defined by the computer-executable instructions, wherein the algorithm can define at least a portion of the master signal 99. In this manner, the computer-executable instructions 154 that define the algorithm 156 can be executed by the processor 158 to generate the master signal 99.

Similarly, an actuator drive 160 can include one or more of a processor 168, computer-readable media 162 accessible by the processor, and a set of computer-executable instructions 164 stored on the media, and an algorithm 166 defined by the computer executable instructions, wherein the algorithm can define at least a portion of a control scheme configured to control one or more actuators such as a first actuator 191 and a second actuator 192 as a function of the master signal 99. In this manner, the computer-executable instructions 164 that define the algorithm 166 can be executed by the processor 168 to control the first actuator 191 and/or the second actuator 192 as a function of the master signal 99.

It is to be understood that the master signal 99 can have any of a number of possible forms and/or configurations. Examples of specific forms and/or configurations of the master signal 99 can include, but are not limited to, an electrical signal, an optical signal, a continuous signal, a discontinuous signal, an amplitude modulating signal, a frequency modulating signal, a polarity modulated signal, a series of discrete pulses, a series of discrete digital values, a wave form signal (e.g., a sine wave, a saw-tooth wave), and the like.

The master signal 99 can be a cyclical signal and/or a repeating signal, wherein the signal has a recognizable periodic cycle or repeating pattern. The signal generator 150 can be configured such that the period of the signal can be increased and/or decreased. That is, it is to be understood that the period (i.e., the rate at which the signal repeats the cycle or pattern) can be selectively speeded up and/or slowed down, thereby correspondingly speeding up or slowing down the operation of one or more of the first actuator 191 and second actuator 192, which are configured to "follow" the master signal. It is to be understood that the first actuator 191 and/or the second actuator 192 can be one or more of the rake-off servo actuator 1142, the carriage/fork servo actuator 1232, the hoist servo actuator 1362, and/or the stick servo actuator 1452.

It is also to be understood that the signal generator 150 can be configured to generate the master signal 99 in accordance with any of a number of possible signal generating apparatus and/or methods. For example, in accordance with one embodiment of the disclosure, the signal generator 150 can be configured to electronically generate the master signal 99, such as by way of the apparatus 100 depicted in FIG. 5.

In accordance with an alternative embodiment of the disclosure that is not specifically depicted, the signal generator 150 can be configured to generate the master signal 99 by way of mechanical means, and/or by way of a device that is at least partially mechanical in nature. Such a mechanical device or means can include, for example, a moving part having markings, such as optical markings and the like, and/or apertures and/or contacts defined thereon. Such a mechanical device or means can also include a light source and/or a laser to shine through the aforementioned apertures. Such a mechanical device or means can also include a reading device configured to read the markings and/or apertures and/or contacts as the part moves relative to the reading device. Such a reading device can include and/or be substantially in the form of an optical scanner, a photo-electric cell, a proximity sensor, an electrical pickup, and the like. That is, it is to be understood that the signal generator 150 can include any means of generating the master signal 99.

Turning now to FIG. 6, a diagram is shown in which a master signal 99 is depicted in accordance with at least one embodiment of the disclosure. The master signal 99 can be generated by the signal generator 150 described above with reference to FIGS. 1-5. As is seen from a study of FIG. 6, the master signal 99 can have a continuous wave form. The master signal 99 can be an amplitude-modulated wave or a frequency modulated wave. Further study of FIG. 6 reveals that more than two, but less than three, periods or cycles of the master signal 99 are depicted.

Turning now to FIG. 7, another diagram is shown in which a master signal 99 is depicted in accordance with at least one embodiment of the disclosure. The master signal 99 can be generated by the signal generator 150 described above with reference to FIGS. 1-5. As is seen from a study of FIG. 7, the master signal 99 can have a discontinuous waveform. The master signal 99 can be an amplitude-modulated wave or a frequency modulated wave. Further study of FIG. 7 reveals that more than two, but less than three, periods or cycles of the master signal 99 are depicted.

Figure 8:
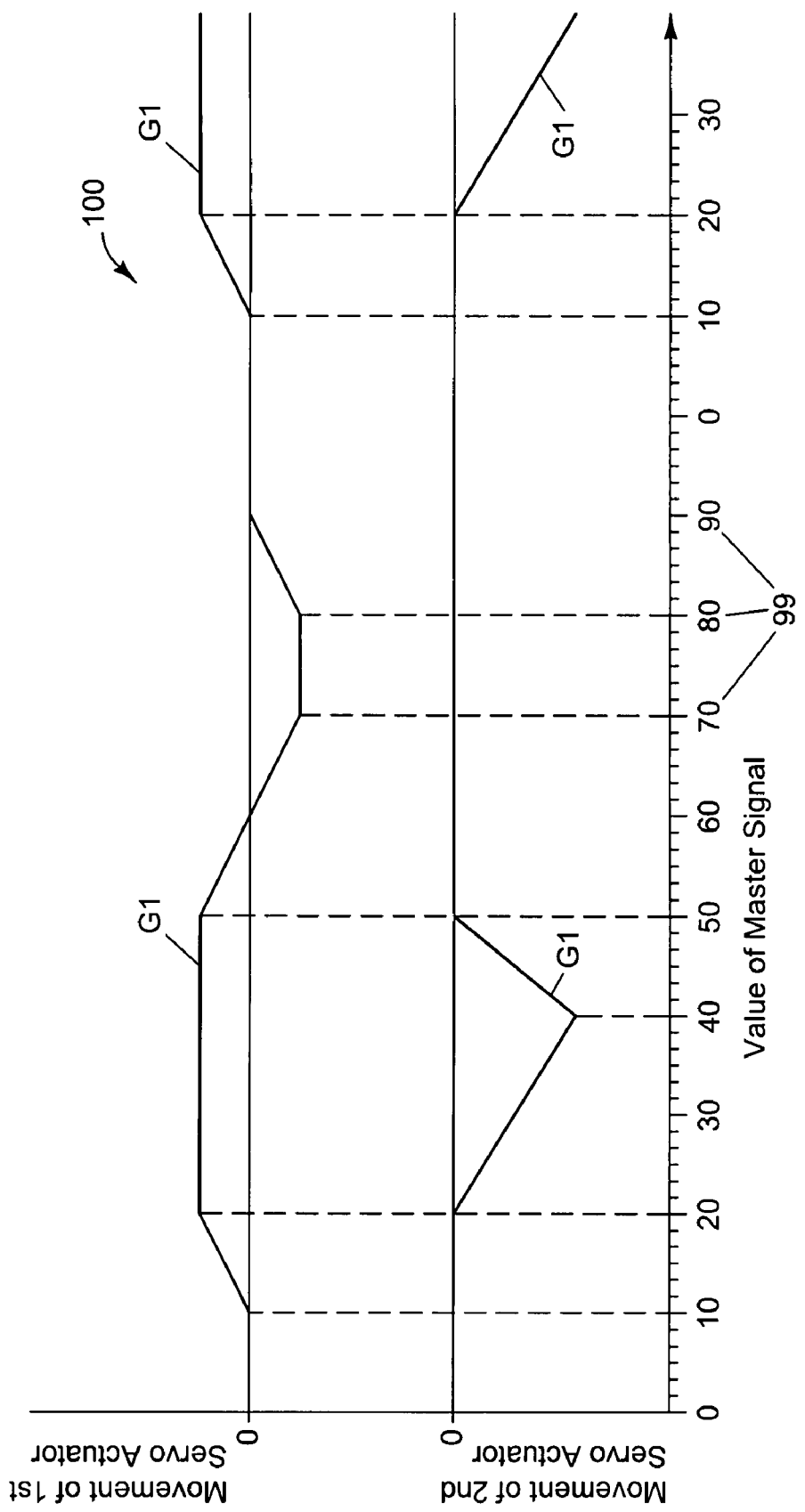
FIG. 8 is a schematic diagram in which the master signal and first and second motion diagrams are depicted.

With reference now to FIG. 8, yet another diagram is shown in which a master signal 99 is depicted in accordance with at least one embodiment of the disclosure. The master signal 99 can be generated by the signal generator 150 described above with reference to FIGS. 1-5. As is seen from a study of FIG. 8, the master signal 99 can be substantially in the form of a set of discrete digital values. In accordance with an exemplary embodiment of the disclosure, each of the discrete digital values making of the master signal 99 can have up to three digits. For example, the first discrete digital value of a cycle or period of the master signal 99 can be "0.0," and the second discrete digital value can be "0.1," and the third discrete digital value can be "0.2," and so on, wherein the last discrete digital value of a cycle or period of the master signal can be "99.9." A first cycle or period of the master signal 99 ends at the discrete digital value of "99.9", and then a second cycle or period begins at the value "0.0." That is, after the discrete digital value of "99.9," the next discrete digital value is "0.0," which starts a new cycle or period, and which then can repeat indefinitely. Thus, in accordance with the exemplary embodiment of the disclosure described immediately herein above, the master signal 99 can include one thousand discrete digital values that repeat indefinitely.

Continued study of FIG. 8 reveals a servo motion profile G1 and a second servo motion profile G2. The first servo motion profile G1 represents movement, or motion, of a first servo actuator (not shown) as a function of the master signal 99. Likewise, the second servo motion profile G2 represents movement, or motion, of a second servo actuator (not shown) as a function of the master signal 99. In accordance with an exemplary embodiment of the disclosure, a first servo actuator begins moving when the value of the master signal 99 is "10.0," as is seen from a close study of FIG. 8. Similarly a second servo actuator begins moving when the value of the master signal 99 is "20.0."

More specifically, it is seen that the first servo actuator begins moving and accelerates in a first direction between the master signal values of "10.0" and "20.0," and then holds a steady speed between the master signal values of "20.0" and "50.0" before decelerating between the master signal values of "50.0" and "60.0" and then accelerating in a second direction between the master signal values of "60.0" and "70.0" and then holding a steady speed in the second direction between the master signal values of "70.0" and "80.0" before finally decelerating between the master signal values of "80.0" and "90.0," whereupon the first servo actuator comes to a stop. It is noted that this same pattern of movement of the first servo actuator begins again during the second cycle of the master signal 99 when the master signal value reaches "10.0."

Further study of FIG. 8 reveals that a second servo actuator begins moving and accelerates in the second direction between the master signal values of "20.0" and "40.0" and then immediately decelerates between the master signal values of "40.0" and "50.0," whereupon the second servo actuator comes to a stop. It is to be understood that the first motion profile G1 of the first servo actuator and the second motion profile G2 of the second servo actuator can each be a direct function of the master signal 99. That is, the first and second motion profiles G1, G2 of each of the first servo actuator and of the second servo actuator can be directly dependent upon the master signal 99.

It is also to be understood that the cyclical, or periodic, speed of the master signal 99 can be selectively varied in accordance with at least one embodiment of the disclosure. Accordingly, the speed at which the motion profiles G1, G2 of the first and second servo actuators can vary in direct response, or relation, to the cyclical, or periodic, speed of the master signal.

For example, an algorithm such as the algorithm 166 shown above with respect to FIG. 5, can be configured to tie the position and/or movement of one or more servo actuators directly to the master signal 99. More specifically, for example, the position of a given servo actuator can be fixed to a corresponding value and/or position of the master signal 99. That is, whenever a given value or position of the master signal 99 occurs, each servo actuator will be, or will attempt to be, in a corresponding position on the associated motion profile. In this manner, the operational speed and/or direction of the stacker 100 can be controlled and/or selectively varied by selectively controlling and/or selectively varying the direction and/or the cyclical, or periodic, speed of the master signal 99.

It is to be further understood that the motion profiles, G1, G2 of the first and second servo actuators can have any of a nearly infinite number of possible shapes and/or configurations without making any change to the master signal 99. For example, one or more servo actuator motion profiles such as the motion profiles G1, G2 can be dependent upon a respective algorithm such as the algorithm 166 discussed above with respect to FIG. 5. Moreover, the number of servo actuators that can operate as a function of the master signal 99 is nearly limitless.

Figure 9:
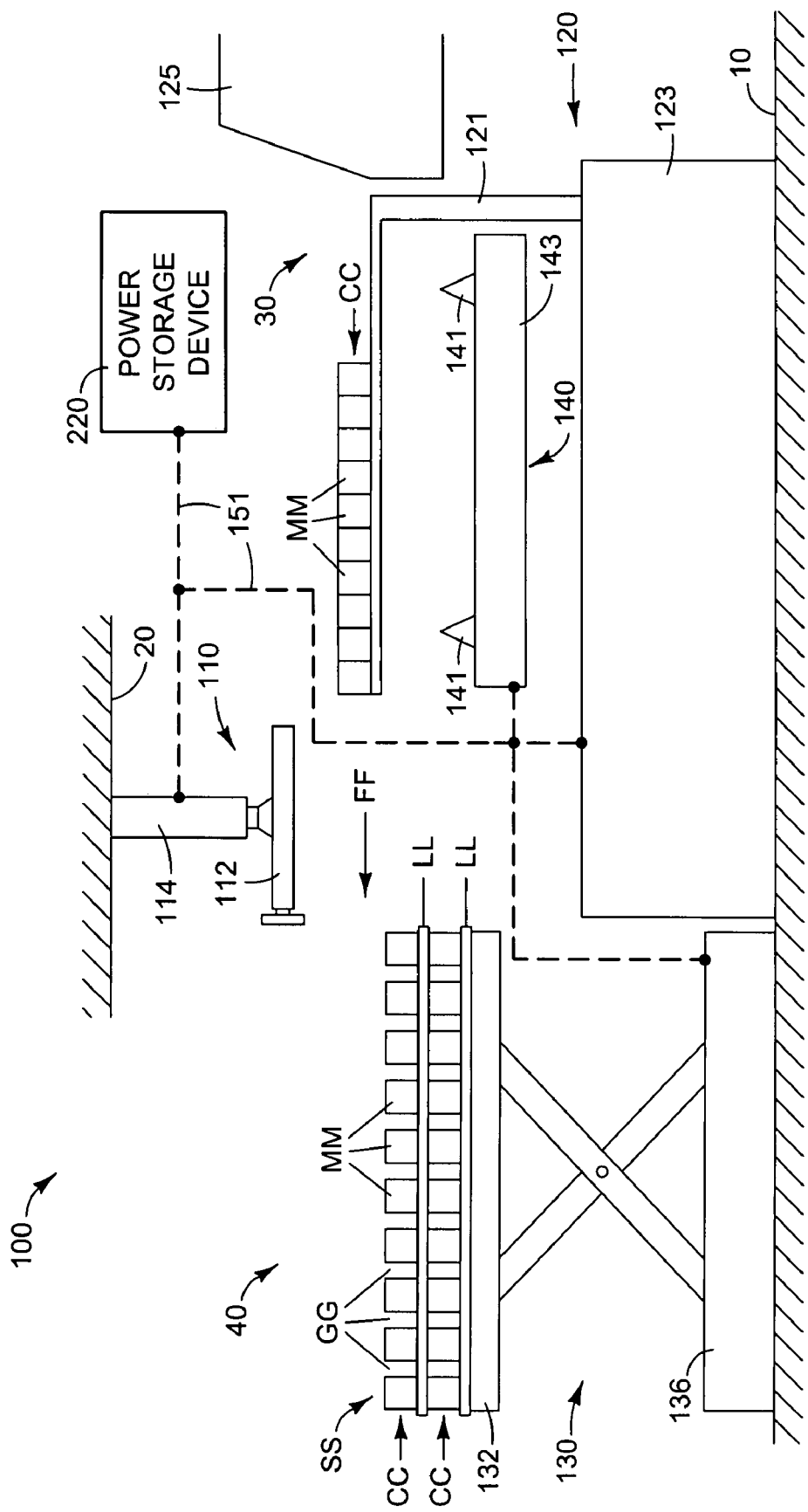
FIG. 9 is a schematic diagram in which the stacker is depicted.

Turning now to FIG. 9, a side elevation schematic view is shown in which the stacker 100 is shown in accordance with at least one embodiment of the disclosure. The stacker 100 can include a power storage device 220 and a power harness 221. The power harness 221 is configured to transmit electrical power between the power storage device 220 and one or more of the rake-off system 110, the carriage/fork system 120, the hoist system 130, and the stick system 140. The power storage device 220 can include and/or be substantially in the form of, a battery and/or at least one capacitor and the like. The power harness 221 can include and/or be substantially in the form of an electrical power cable or wire, one or more electrical switches, transformers, or any of a number of other such electrical power components commonly associated with electrical power transmission and/or distribution.

Figure 10:
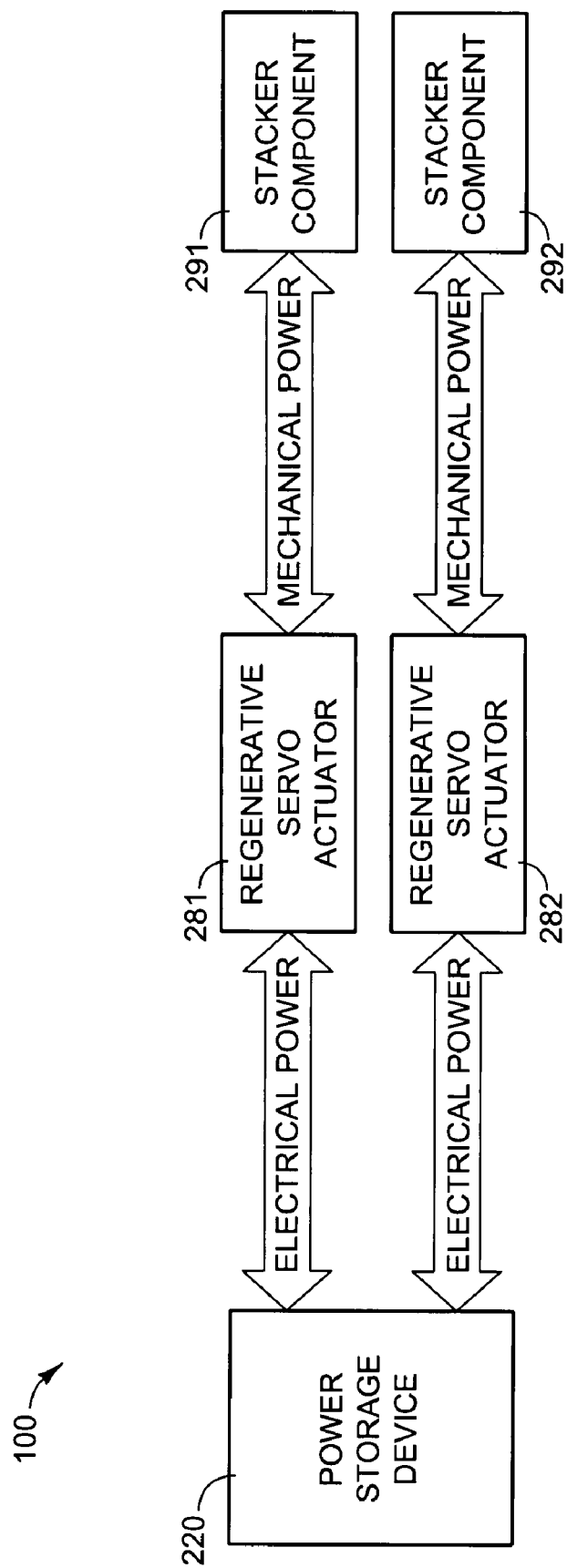
FIG. 10 is a schematic diagram in which the stacker is depicted.

With reference now to FIG. 10, a schematic diagram is shown in which the stacker is depicted in accordance with at least one embodiment of the disclosure. The stacker 100 can include one or more movable stacker components such as a first stacker component 291 and a second stacker component 292. The first and second stacker components 291, 292 can be, for example, one or more of a rake-off device 112, a carriage/fork device 121, a hoist device 132, and a stick device 141, as described above with respect to FIGS. 1-9.

The stacker 100 can also include one or more regenerative servo actuators 281, 282. The one or more regenerative servo actuators 281, 282 can be components of the rake-off actuation system 114 and/or the carriage/fork actuation system 123 and/or the hoist actuation system 136 and/or the stick actuation system 143, which are described above with respect to FIGS. 1-3. That is, each of the first and second stacker components 291, 292 can be mechanically linked with a respective regenerative servo actuators 281, 282, wherein a respective servo actuator 281, 282 provides mechanical power to an associated stacker component 291, 292, and wherein such movement is a function of the master signal 99 generated by the signal generator 150, as is described above with respect to FIGS. 1-8. More specifically, for example, one or more of the hoist servo actuator 1362, the carriage/fork servo actuator 1232, the rake-off servo actuator 1142, and the stick servo actuator 1452, described above with reference to FIG. 3, can be a regenerative servo actuator such as the regenerative servo actuators 281, 282.

With continued reference to FIG. 10, the regenerative servo actuators 281, 282 are "regenerative" in that they are configured to generate electrical power from mechanical power. That is, mechanical force and/or mechanical power can be applied to the regenerative servo actuator 281, 282 so as to cause movement of the servo actuator, wherein such movement of the servo actuator causes the servo actuator to generate electrical power. Such mechanical power and/or mechanical force can be applied to one or more of the regenerative servo actuators 281, 282 by a respective stacker component 291, 292.

For example, one or more of the stacker components 291, 292 can have mechanical energy in the form of elevation and/or inertia. That is, one or more of the stacker components can be elevated to an uppermost position against the force of gravity and/or can be in substantially lateral motion. Accordingly, one or more of the regenerative servo actuators 281, 282 can apply a regenerative braking force to the respective stacker component 291, 292 such that the stacker component is lowered and brought to a controlled stop against the force of gravity from an uppermost position to a lower elevation, and/or such that the stacker component is slowed and brought to a stop from its lateral motion. In either instance, the regenerative braking force provided to the stacker component 291, 292 by the respective regenerative servo actuator 281, 282 can result in the generation of electrical power. Such electrical power generated by the regenerative servo actuators 281, 282 can be sent to the power storage device 220 and stored therein until the power is needed. Accordingly, the power stored in the power storage device 220 can be sent to the regenerative servo actuators 281, 282 for use in providing mechanical power and/or mechanical force to the respective stacker component 291, 292.

In accordance with at least one embodiment of the disclosure, a stacking method includes generating a cyclical master signal such as the master signal 99 shown in FIGS. 4-8, and providing one or more of a stick device such as the stick device 141, a hoist device such as the hoist device 132, a carriage/fork device such as the carriage/fork device 121, and a rake-off device such as the rake-off device 112, all shown in FIGS. 1-3 and 9. The method includes controlling the respective movements of the stick device, the hoist device, the carriage/fork device and the rake-off device as respective functions of the master signal. The master signal can be generated by a signal generator as is described above with respect to FIGS. 1-8.

In accordance with the method, the respective movements of the stick device and/or the carriage/fork device and/or the hoist device and/or the rake-off device can be controlled in a manner wherein one or more operations and/or functions required for forming a stack of material as generally described hereinabove is accomplished. By way of example, the stick device can be controlled in accordance with the method wherein one or more sticks or stickers are placed on the carriage/fork device and/or placed within the stack as the stack is being formed. Likewise, the carriage/fork device can be controlled so as to place a course of material, which can include one or more sticks, onto a stack of material. Also, for example, the rake-off device can be controlled so as to facilitate removal of a course of material from the carriage/fork device as the carriage/fork device places the course of material onto the stack. Likewise, for example, the hoist device can be controlled so as to substantially maintain the top of the stack at a given elevation, all of which is generally described above with respect to FIGS. 1-8.

The method can include generating electrical power from mechanical power imparted to one or more of the stick device, the hoist device, the carriage/fork device and the rake-off device, as is described above with respect to FIGS. 9 and 10. The method can include storing the electrical power as is also described above with respect to FIGS. 9 and 10. The method can further include providing regenerative braking power to one or more of the stick device, the hoist device, the carriage/fork device and the rake-off device as is further described above with respect to FIGS. 9 and 10.

Typical operation of the stacker 100 is now described below with reference to FIGS. 1-10. Operation of the stacker 100 can begin with generation, by the signal generator 150, of a cyclical master signal 99. As is mentioned above, the master signal 99 can have a cyclical nature, wherein the signal can have a regular, repetitive and/or periodic pattern or cycle. The master signal 99 can be generated by an algorithm 156 that can be defined by a set of computer-executable instructions 154, as is described above.

The master signal 99 can be transmitted to, and received by, one or more of the rake-off actuation system 114, the carriage/fork actuation system 123, the hoist actuation system 136, and the stick actuation system 143. More specifically, the signal generator 150 can generate the master signal 99, and then transmitted the master signal to one or more of the stick servo drive 1451, the hoist servo drive 1361, the carriage/fork servo drive 1231 and the rake-off servo drive 1141. In one respect, the master signal 99 can be compared to a master cam or master cog that is followed by each of the actuators, such as servo actuators 1362, 1232, 1142, 191, 192, 281 and 282, wherein the master signal acts to "synchronize" the movements of two or more of the servo actuators.

In accordance with at least one embodiment of the present disclosure, an algorithm 166, which can be defined by a set of computer-executable instructions 164, can define one or more servo motion profiles such as the servo motion profiles G1, G2. in accordance with at least one embodiment of the disclosure, each motion profile, such as motion profiles G1, G2 can be substantially in the form of a mathematical formula or function, wherein a given value of the master signal 99 that is "plugged into" the formula results in a corresponding point on a respective motion profile.

In this manner, a given servo actuator can be caused to move, or provide motion and/or motive force, as a function of the master signal. In other words, an algorithm such as the algorithm 166 can be employed, in conjunction with the processor 168, to generate one or more servo motion profiles such as the servo motion profiles G1, G2, as respective functions of the master signal 99. Accordingly, as the master signal 99 is generated, one or more of the rake-off device 112, the carriage/fork device 121, the hoist device 132, and the stick device 141, can be caused to move in accordance with a respective servo motion profile, wherein the movement of each device "follows," or directly corresponds with, the master signal 99. More specifically, the motion, or movement, of each of the rake-off device 112, the carriage/fork device 121, the hoist device 132, and the stick device 141, can be a function of the master signal 99 so as to be synchronized with one another such that a stack SS is formed generally in the manner described above with respect to FIGS. 1 and 2.

It is to be understood that other components not specifically described and/or depicted herein can be included in the stacker 100, and can be controlled as a function of the master signal 99 as is generally described herein. It is also to be understood that the stacker 100 need not include all of the components described and/or depicted herein in order to function as intended.

Continuing with the description of a typical operation of the stacker 100, as is described herein above, the rake-off device 112, the carriage/fork device 121, the hoist device 132, and the stick device 141 can each be moved by respective actuators such as servo actuators 1142, 1232, 1362, and 1452, respectively. As is also explained herein above, one or more of the actuators providing movement to the respective aforementioned devices can include and/or be substantially in the form of a regenerative servo actuator.

Accordingly, by way of example only, as the carriage/fork device 121 moves toward the hoist device 132 as described herein above with respect to FIGS. 1 and 2, the respective regenerative servo actuator can be caused to apply, or provide, a regenerative braking force to the carriage/fork device so as to slow, and bring to a stop, the carriage/fork device at the appropriate position above the hoist device. Similarly, as the rake-off device 112 is lowered as described herein above with respect to FIGS. 1 and 2, the respective regenerative servo actuator can be caused to apply, or provide, a regenerative braking force to the rake-off device so as to slow, and bring to a stop, the carriage/fork device at the appropriate position above the carriage/fork device 121. Likewise, as the hoist device 132 is lowered as described herein above with respect to FIGS. 1 and 2, the respective regenerative servo actuator can be caused to apply, or provide, a regenerative braking force to the hoist device so as to slow, and bring to a stop, the hoist device at the appropriate elevation. Such regenerative braking forces applied as discussed immediately above can result in generation of electrical power, which can thus be sent, or transmitted, to the power storage device 220, as is described above with respect to FIGS. 9 and 10. At least a portion of the power so stored can subsequently be used to impart movement to the carriage/fork device 121 and/or to raise the hoist device 132 and/or to raise the rake-off device 112 in the respective manners described above with respect to FIGS. 1 and 2.

With reference now to FIG. 3, in accordance with at least one embodiment of the present disclosure, one or more of the rake-off servo actuator 1142, the carriage/fork servo actuator 1232, the hoist servo actuator 1362, and the stick servo actuator 1452, can be an A/C servomotor with integral absolute encoder feedback. Also in accordance with such an embodiment, one or more of the rake-off servo drive 1141, the carriage/fork servo drive 1231, the hoist servo drive 1361, and the stick servo drive 1451, can be a digital servo drive with integral motion controller. In this manner, each servomotor can be configured to operate in a closed loop fashion to track position and speed of the master signal 99 (shown in FIGS. 4-8), whereby each servomotor can stay in substantial positional relationship with the master signal and with each of the other servomotors that are also following the master signal. Also in accordance with at least one embodiment of the present disclosure, a main controller such as a PLC or the like (not shown) can be employed for control functions such as for controlling the speed and direction of the master signal 99.

The preceding description has been presented only to illustrate and describe methods and apparatus in accordance with respective embodiments of the present invention. It is not intended to be exhaustive or to limit the disclosure to any precise form disclosed. Many modifications and variations are possible in light of the above teaching. It is intended that the scope of the invention be defined by the following claims.

What is claimed is:

1. An underlayment stickering stacker, comprising:
   a hoist device configured to support a stack of material comprising a plurality of courses;
   a regenerative hoist actuator configured to impart movement to the hoist device, and to provide regenerative braking power to the hoist device;
   a carriage/fork device configured to move each course of material from an infeed device to the hoist device, thereby forming the stack of material;
   a regenerative carriage/fork actuator configured to impart movement to the carriage/fork device and to provide regenerative braking power to the carriage/fork device;
   a rake-off device configured to facilitate removal of each course of material from the carriage/fork device;
   a regenerative rake-off actuator configured to impart movement to the rake-off device and to provide regenerative braking power to the rake-off device;
   a signal generator configured to generate a cyclical master signal;
   a carriage/fork servo drive, wherein the carriage/fork actuator is configured to move to the carriage/fork device according to a predetermined cyclical carriage/fork motion pattern, and the carriage/fork servo drive is configured to cause the carriage/fork motion pattern to be substantially synchronized with the master signal;
   a rake-off servo drive, wherein the rake-off actuator is configured to move the rake-off device according to a predetermined cyclical rake-off motion pattern, and the rake-off servo drive is configured to cause the rake-off motion pattern to be substantially synchronized with the master signal;
   a stick device configured to facilitate underlayment of sticks;
   a stick servo actuator configured to move the stick device according to a predetermined cyclical stick motion pattern; and
   a stick servo drive configured to cause the stick motion pattern to be substantially synchronized with the master signal.

2. The stacker of claim 1, further comprising an electrical power storage device configured to store electrical power generated by regenerative braking of the hoist actuator, the carriage/fork actuator and the rake-off actuator.

3. The stacker of claim 1, further comprising:
   at least one computer-readable storage device; and
   at least one set of computer executable instructions stored on the storage device, wherein the at least one set of computer executable instructions define, as a function of the cyclical signal, movement of at least one actuator selected from the group consisting of the stick servo actuator, the carriage/fork actuator and the rake-off actuator.

4. An underlayment stickering stacking method, comprising:
   providing a hoist device configured to support a stack of material;
   providing a carriage/fork device configured to move each course of material from a course forming station to the hoist device, thereby forming the stack of material;
   providing a rake-off device configured to facilitate removal of each course of material from the carriage/fork device;
   providing regenerative braking power to one of the devices selected from the group consisting of the hoist device, the carriage/fork device and the rake-off device;
   generating a cyclical master signal;
   controlling movement of the carriage/fork device as a function of the master signal;
   controlling movement of the rake-off device as a function of the master signal;
   providing a stick device configured to facilitate underlayment of sticks; and
   controlling movement of the stick device as a function of the master signal.

5. The method of claim 4, further comprising controlling movement of the hoist device as a function of the master signal.

\* \* \* \* \*